US005940647A

United States Patent [19]

Abe

[11] Patent Number: 5,940,647
[45] Date of Patent: *Aug. 17, 1999

[54] IMAGE RECORDING DEVICE

[75] Inventor: Tetsuya Abe, Tokyo, Japan

[73] Assignee: Asahi Kogaku Kogyo Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/677,188

[22] Filed: Jul. 9, 1996

[30] Foreign Application Priority Data

Jul. 10, 1995 [JP] Japan ................................. 7-197028

[51] Int. Cl.$^6$ .................................................. G03B 19/00
[52] U.S. Cl. .......................................... 396/429; 396/317
[58] Field of Search ..................................... 396/315, 317, 396/318, 30, 429

[56] References Cited

U.S. PATENT DOCUMENTS

| | | | |
|---|---|---|---|
| 4,714,962 | 12/1987 | Levine | 358/209 |
| 4,755,880 | 7/1988 | Haenel et al. | 358/213.11 |
| 5,128,702 | 7/1992 | Ogawa et al. | 354/106 |
| 5,132,825 | 7/1992 | Miyadera . | |
| 5,191,408 | 3/1993 | Takanashi et al. | 358/49 |
| 5,283,632 | 2/1994 | Suzuki et al. | 348/223 |
| 5,315,410 | 5/1994 | Takanshi et al. | 358/471 |
| 5,424,156 | 6/1995 | Aoki et al. . | |
| 5,516,607 | 5/1996 | Iijima et al. | 430/20 |
| 5,525,810 | 6/1996 | Jewell et al. | 250/566 |
| 5,589,952 | 12/1996 | Sato et al. | 358/487 |
| 5,638,103 | 6/1997 | Obata et al. | 347/164 |
| 5,703,700 | 12/1997 | Birgmeir et al. | 358/487 |

FOREIGN PATENT DOCUMENTS

| | | |
|---|---|---|
| 0327236 | 9/1989 | European Pat. Off. . |
| 5-2280 | 1/1993 | Japan . |
| 6313894 | 11/1994 | Japan . |

*Primary Examiner*—Safet Metjahic
*Assistant Examiner*—John Chizmar
*Attorney, Agent, or Firm*—Greenblum & Bernstein P.L.C.

[57] ABSTRACT

An image recording device using an electro-developing recording medium by which an object image formed thereon is electronically developed. The recording medium has a first recording area in which the object image is recorded, and a second recording area in which information other than the object image is recorded. The first recording area has three recording portions in which red, green and blue images are recorded, respectively. The information may be a color temperature information. The red, green and blue images are read out from the first recording area in accordance with the color temperature information, so that an image having a natural color is obtained.

26 Claims, 16 Drawing Sheets

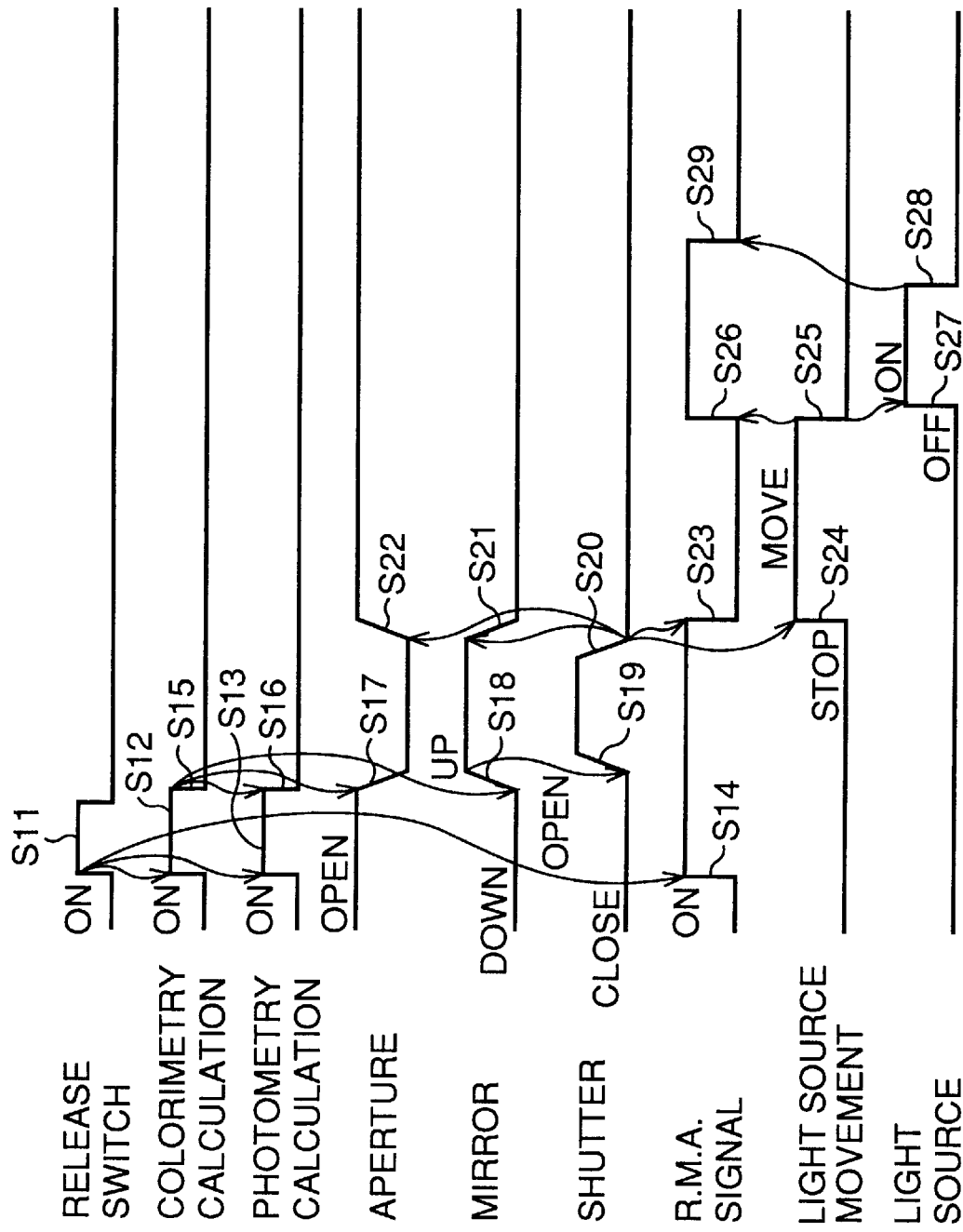

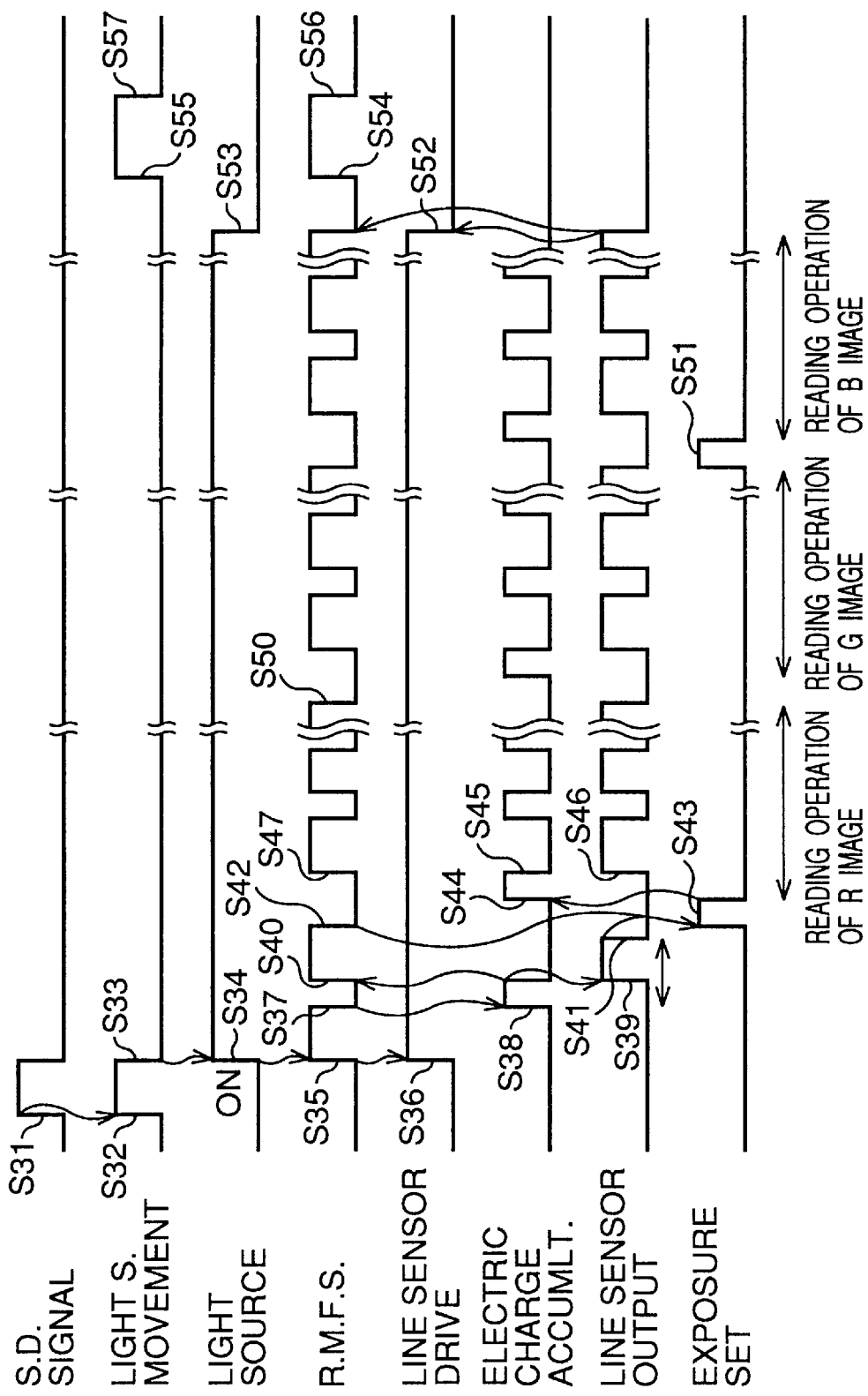

IMAGE RECORDING DEVICE

BACKGROUND OF THE INVENTION

1. Field of the Invention

The present invention relates to an image recording device using a photosensitive recording medium, especially to an image recording device by which information relating to a photographing condition such as color temperature information is recorded.

2. Description of the Related Art

Conventionally, there is known a photographic material which electronically develops an optical image formed thereon through a photographing lens. U.S. Pat. No. 5,424,156 (corresponding to Japanese Unexamined Patent Publication No. 5-2280), for example, discloses a recording medium which is a combination of an electrostatic information recording medium and an electric charge keeping medium. In this specification, such a recording medium is referred to as an electro-developing recording medium.

In the electro-developing recording medium disclosed in the above publication, the electrostatic information recording medium has a photoconducting layer and an inorganic oxide material layer, and the electric charge keeping medium has a liquid crystal display. In this structure, when the electrostatic information recording medium is exposed while an electric voltage is applied to the electrostatic information recording medium and the electric charge keeping medium, electric charge in accordance with the amount of incident light is generated in the electrostatic information recording medium. Since the intensity of electric field applied to the liquid crystal display facing the electrostatic information recording medium is varied in accordance with the generated electric charge, an image corresponding to the amount of light distribution is indicated by, or developed on, the liquid crystal display.

In the device using the photosensitive recording medium on which an image corresponding to the light amount distribution is recorded, a high quality image can be recorded in the recording medium, but information relating to a photographing condition such as color temperature information cannot be recorded therein.

SUMMARY OF THE INVENTION

Therefore, an object of the present invention is to provide an image recording device by which a photographed object image is recorded, and information other than the object image, can be recorded in the photosensitive recording medium.

According to the present invention, there is provided an image recording device comprising a recording medium and a light source. The recording medium has a first recording area in which an object image is recorded, and a second recording area in which information other than the object image is recorded. The light source emits a light beam by which such information is recorded in the second recording area.

Further, according to the present invention, there is provided an image recording device comprising a recording medium, image recording means, information recording means, image reading means and information reading means. The recording medium has a first recording area in which an object image is recorded, and a second recording area provided in a portion of the recording medium different from the portion thereof containing the first recording area. The image recording means records an object image in the first recording area, and the information recording means records color temperature information of the object image in the second recording area when the image recording means records the object image. The image reading means reads the object image recorded in the first recording area. The information reading means reads the information recorded in the second recording area when the image reading means reads the object image. The image reading means reads the object image based on the information read from the second recording area.

BRIEF DESCRIPTION OF THE DRAWINGS

The objects and advantages of the present invention will be better understood from the following description, with reference to the accompanying drawings in which:

FIG. 8 is a timing chart of a photographing operation of an image signal onto the electro-developing recording medium;

FIG. 10 is a timing chart of a reading operation in which an object image recorded in the electro-developing recording medium is read therefrom.

DESCRIPTION OF PREFERRED EMBODIMENTS

Figure 1:
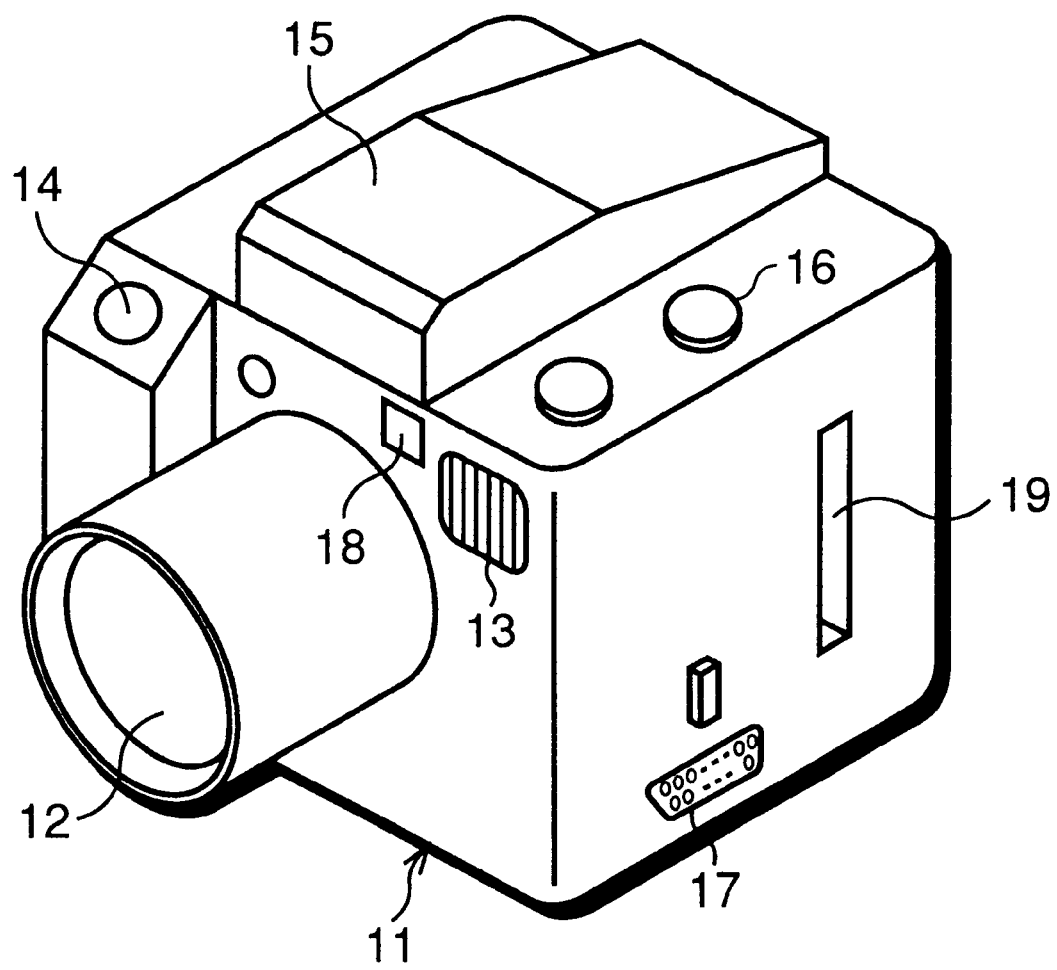
FIG. 1 is an external view showing a still video camera to which an embodiment according to the present invention is applied.

FIG. 1 is an external view of a still video camera to which an embodiment of the present invention is applied. This still video camera is constructed in such a manner that an image is developed by a photosensitive electro-developing recording medium.

When viewing the camera body 11 from a front side, on the front surface of the camera body 11, a photographing optical system 12 including a photographing lens, and so on, is provided on approximately the central portion of the front surface. An electronic flash 13 is disposed on a portion to the right of and above the photographing optical system 12. A release switch 14 is provided at the side of the photographing optical system 12 opposite to the electronic flash 13. A colorimetry sensor 18 is provided on the front surface of the camera body 11 close to the electronic flash 13.

When the release switch 14 is partly depressed, a distance measurement is performed, and a colorimetry is carried out based on a colorimetry value obtained through the colorimetry sensor 18. When the release switch 14 is fully depressed, a photographing operation is performed.

On the upper surface of the camera body 11, a view finder 15 is provided at the center portion thereof, and operation switches, including a scan start switch 16, are provided on a side of the view finder 15. On a side surface of the camera body 11, an output terminal 17 is formed at a lower portion thereof so that an image signal obtained by this camera can be outputted to an external recording device. A slot 19 is provided, through which an electro-developing recording medium can be set or mounted into the camera body 11.

Figure 2:
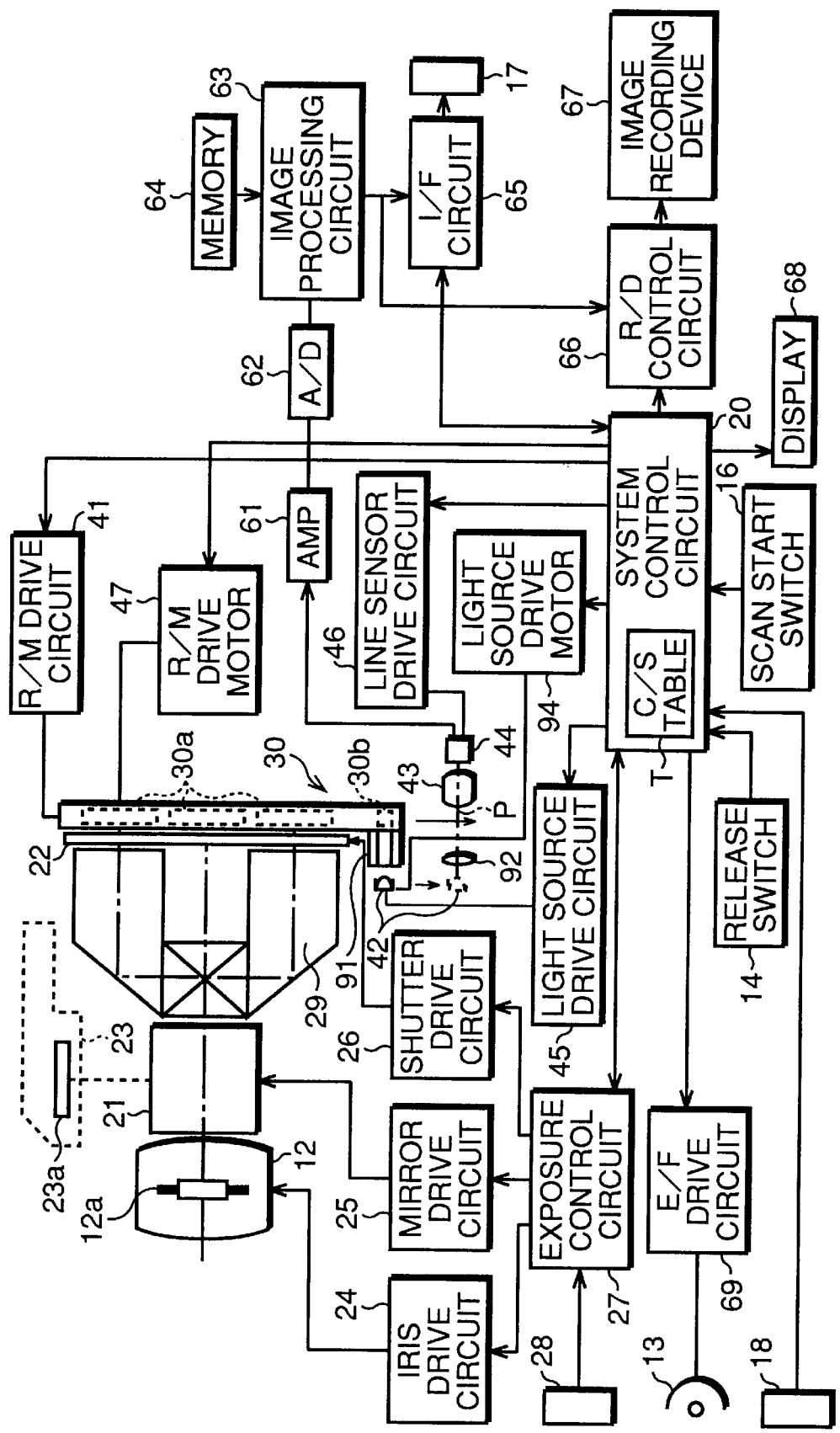
FIG. 2 is a block diagram of the still video camera of the embodiment shown in FIG. 1.
Figure 3:
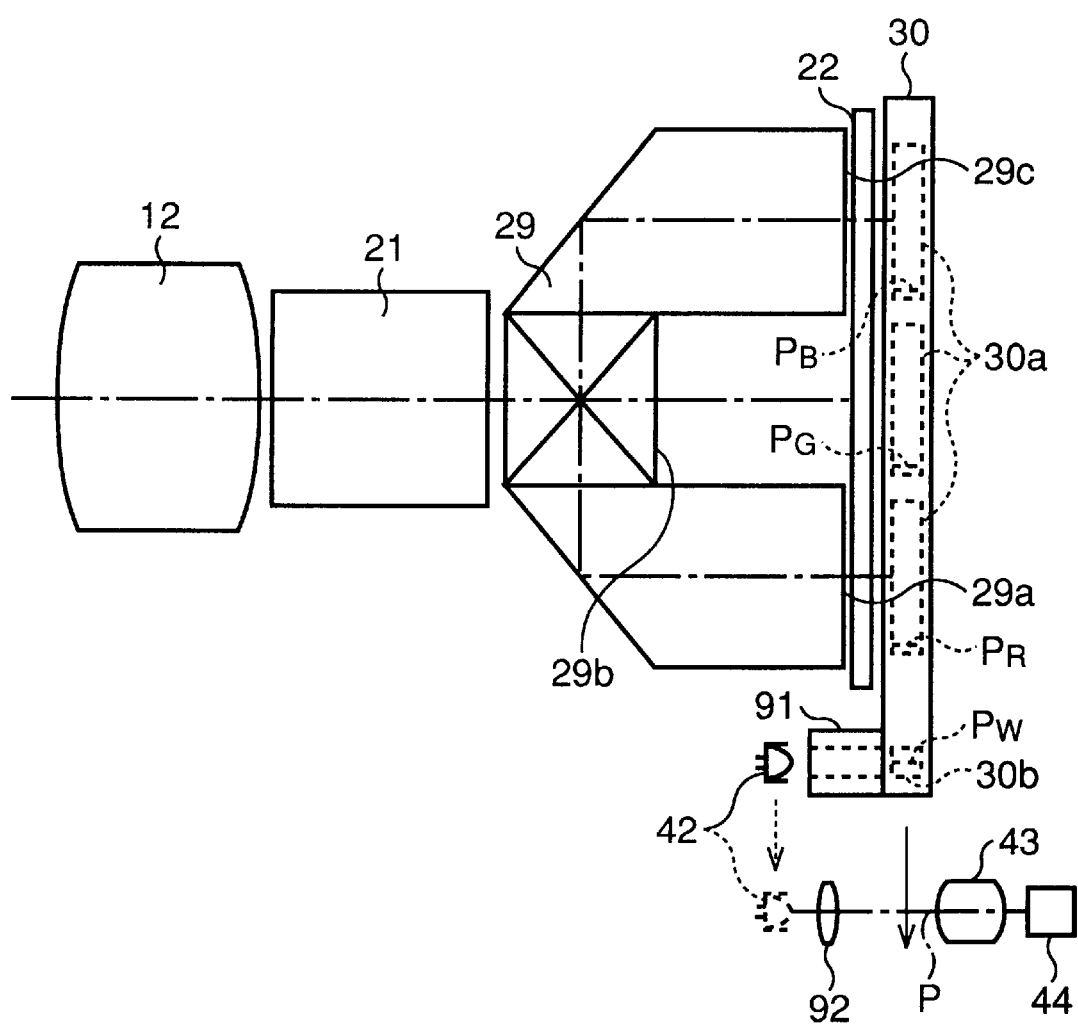
FIG. 3 is a plane view showing a color separation prism and parts provide close thereto.

FIG. 2 is a block diagram of the still video camera. A system control circuit 20 including a micro-computer is provided, to control the still video camera as a whole.

The photographing optical system 12 has a plurality of lens groups and an aperture 12a. A color separation prism 29 and an electro-developing recording medium 30 are disposed behind the photographing optical system 12. The color separation prism 29 is positioned closer to the photographing optical system 12 than the electro-developing recording medium 30. The color separation prism 29 is provided for obtaining red, green and blue images of the object to be photographed.

A quick return mirror 21 is placed between the photographing optical system 12 and the color separation prism 29. A focusing glass 23a, included in a view-finder optical system 23, is disposed above the quick return mirror 21. It should be noted that, although the view-finder optical system 23 appears to be located at the side of the quick return mirror 21 in FIG. 2, in the actual structure, it is positioned above the quick return mirror 21. A shutter 22 is provided between the color separation prism 29 and the electro-developing recording medium 30.

The electro-developing recording medium 30 has a first recording area 30a and a second recording area 30b. The first recording area 30a has three recording portions in which red, green and blue images are recorded, respectively. The second recording area 30b is provided for recording information other than the object image, for example, a photographing condition such as a color temperature of the ambient light of the object.

The aperture 12a, the quick return mirror 21 and the shutter 22 are driven by an iris drive circuit 24, a mirror drive circuit 25 and a shutter drive circuit 26, respectively, all of which are controlled by an exposure control circuit 27.

The exposure control circuit 27 is operated in accordance with a command signal outputted by the system control circuit 20. That is, when an exposure is controlled, the opening degree of the aperture 12a is adjusted by the iris drive circuit 24 under control of the exposure control circuit 27, based on an output signal of a photometry sensor 28.

Figure 4:
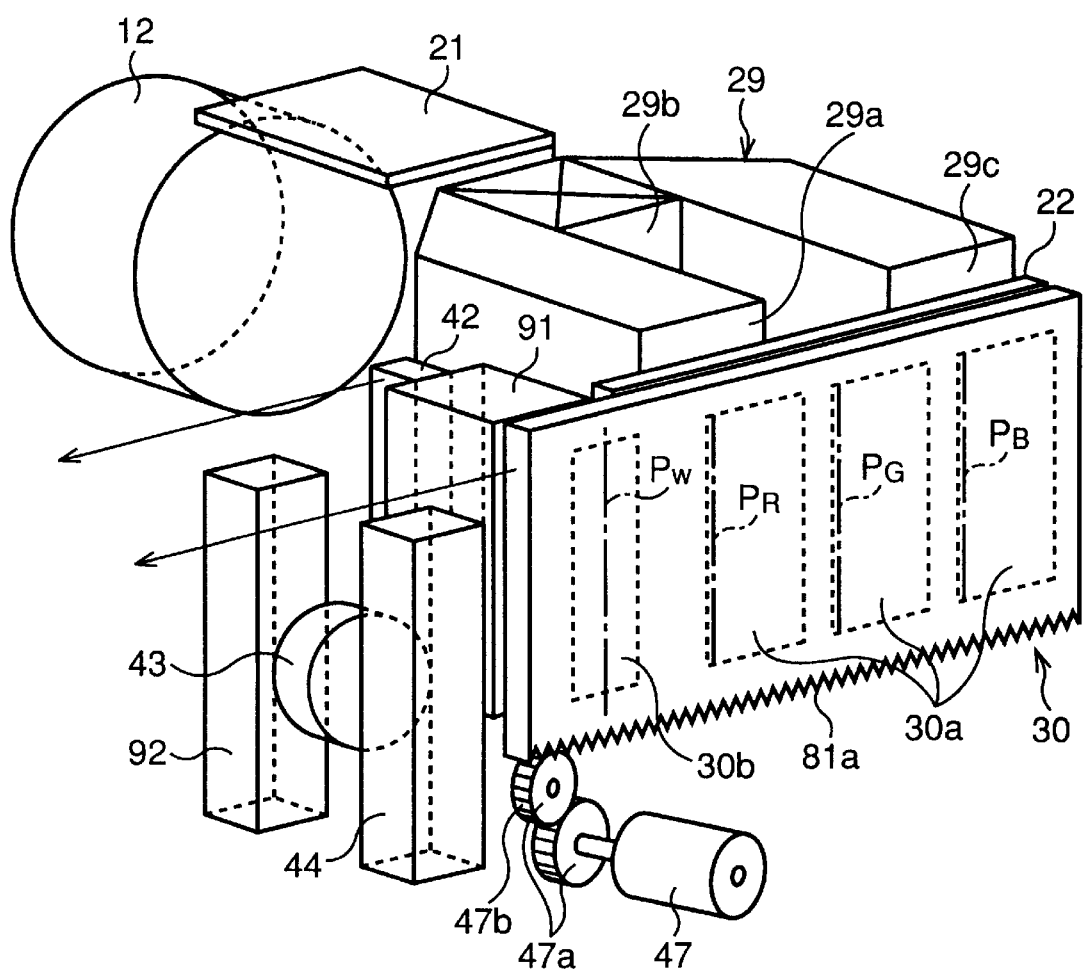
FIG. 4 is a perspective view showing a mechanism by which an electro-developing recording medium is moved.

The quick return mirror 21 is usually set to a down position, at an angle of approximately 45 degrees, and thus a light beam passing through the photographing optical system 12 is led to the view-finder optical system 23, whereby an object to be photographed can be observed by the photographer. When a photographing operation is carried out, the quick return mirror 21 is rotated upward by the mirror drive circuit 25 and set to an up position (a horizontal position as shown in FIG. 4), whereby the light beam is led to the electro-developing recording medium 30.

The shutter 22 is usually closed. During a photographing operation, however, the shutter 22 is opened for a predetermined period by the shutter drive circuit 26, under control of the exposure control circuit 27. Thus, the light beam passing through the photographing optical system 12 enters a light receiving surface of the electro-developing recording medium 30, through the color separation prism 29, so that red, green and blue images are formed on the three recording portions of the first recording area 30a, respectively.

An electric voltage is applied to the electro-developing recording medium 30 under control of a recording medium (R/M) drive circuit 41. Then, by exposing the electro-developing recording medium 30 while applying the electric voltage thereto, an image formed by the photographing optical system 12 is electronically developed on the electro-developing recording medium 30 as a visible image. Note that the recording medium drive circuit 41 is operated in accordance with a command signal outputted by the system control circuit 20.

A pattern record unit 91 is disposed beside the shutter 22 such that, when the color separation prism 29 faces the first recording area 30a, the pattern record unit 91 faces the second recording area 30b. The pattern record unit 91 is provided for recording information such as the color temperature information of the image on the second recording area 30b.

A collimator lens array 92 is placed beside the pattern record unit 91 and at a predetermined distance therefrom. A scanner optical system 43 and a line sensor 44 are positioned on the optical axis of the collimator lens array 92. Namely, the collimator lens array 92, the scanner optical system 43 and the line sensor 44 are aligned with each other in a straight line.

A light source 42, including an LED (light emitting diode), for example, is placed in front of the electro-developing recording medium 30, and can be moved to face either the pattern record unit 91 or the collimator lens array 92. The light source 42 is moved by a light source drive motor 94 under control of the system control circuit 20.

The line sensor 44 may be a one dimensional CCD sensor of 2000 pixels, for example, and is placed in an imaging plane, on which an image is formed, by the scanner optical system 43.

The electro-developing recording medium 30 can be moved along the longitudinal direction thereof by a recording medium drive motor 47 controlled by the system control circuit 20. Namely, the electro-developing recording medium 30 can be moved in a direction perpendicular to the optical axis of the collimator lens array 92 and the scanner optical system 43. In a state in which the light source 42 is positioned to face the collimator lens array 92, when the electro-developing recording medium 30 crosses the optical axis of the collimator lens array 92, the scanner optical system 43 and the line sensor 44 are positioned behind the recording medium 30, whereby a light beam emitted from the light source 42 is passed through the recording medium 30 and enters the line sensor 44 through the scanner optical system 43. Namely, the object image recorded on the recording medium 30 is illuminated by the light source 42, and is formed on the light receiving surface of the line sensor 44 by an operation of the scanner optical system 43.

ON-OFF control of the light source 42 is performed by a light source drive circuit 45. Control of the reading operation of the pixel signal generated in the line sensor 44 is carried out by a line sensor drive circuit 46. The circuits 45 and 46, and the recording medium drive motor 47 are controlled by the system control circuit 20.

A pixel signal read out from the line sensor 44 is amplified by an amplifier 61 and converted to a digital signal by an A/D converter 62.

The digital pixel signal is subjected to a shading correction, a gamma correction and so on, by an image processing circuit 63, under control of the system control circuit 20, and is then temporarily stored in a memory 64. The memory 64 includes an EEPROM in which correction data for the shading correction is stored. Note that the memory 64 may have a storage capacity equal to one horizontal scanning line outputted from the line sensor 44, or it may have a storage capacity of one frame's worth of image signals.

The pixel signal outputted from the memory 64 is inputted into an interface circuit 65 through the image processing circuit 63, so that the pixel signal is subjected to a predetermined process such as a format conversion, and can be outputted to an external display device (not shown) through the output terminal 17. The pixel signal outputted from the image processing circuit 63 is subjected to a predetermined process such as an image compression and a format conversion in a recording device (R/D) control circuit 66, so that the pixel signal can be recorded on a recording medium such as an IC memory card, for example, in an image recording device 67. The interface circuit 65 and the recording device control circuit 66 are operated in accordance with a command signal outputted from the system control circuit 20.

The release switch 14 and the scan start switch 16 are connected to the system control circuit 20. A photographing operation is performed by the operation of the release switch 14. A reading operation by which an image signal is read from the electro-developing recording medium 30, is performed in accordance with the operation of the scan start switch 16.

Further, a display device 68 and an electronic flash drive circuit 69 are connected to the system control circuit 20. The display device 68 is provided for indicating various setting conditions of the still video camera. The electronic flash drive circuit 69 is provided for controlling the electronic flash 13 so that the electronic flash 13 radiates a flash of light.

FIGS. 3 through 6 show a construction by which red, green and blue images and color temperature information are formed on the electro-developing recording medium 30, and the images and information are read out from the recording medium 30.

The first recording area 30a is separated into three recording portions by a mask member (not shown) which covers the light receiving surface of the recording medium 30. The three recording portions of the first recording area 30a and the second recording area 30b are aligned in the longitudinal direction of the electro-developing recording medium 30.

The color separation prism 29 has three emergent planes 29a, 29b and 29c, facing the shutter 22. The color separation prism 29 is constructed such that a luminous flux led from the photographing optical system 12 is split into red, green and blue luminous fluxes, and the red, green and blue images are formed on the same plane, which is included in the electro-developing recording medium 30.

The electro-developing recording medium 30 has a rack 81a on an underedge thereof. An output gear 47a fixed on an output shaft of the recording medium drive motor 47 is meshed with a pinion 47b, which meshes with the rack 81a. Accordingly, when the output shaft of the recording medium drive motor 47 is rotated, the electro-developing recording medium 30 is moved along the longitudinal direction thereof.

Figure 5:
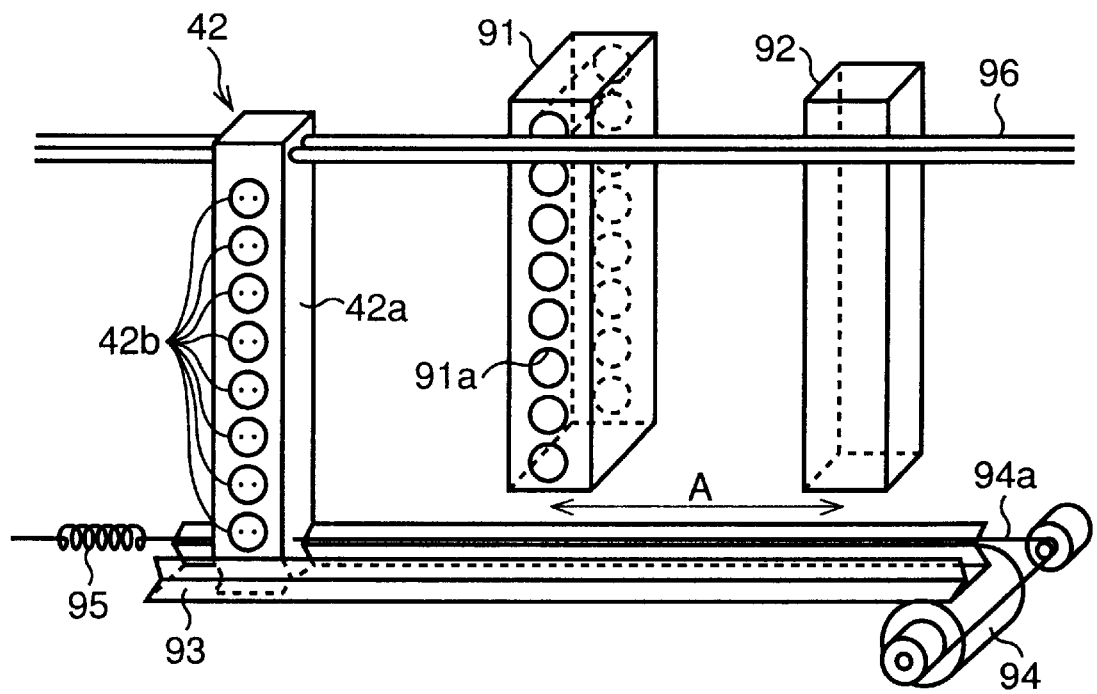
FIG. 5 is a perspective view showing a light source, a pattern record unit and a collimator lens array.

In FIG. 5, although the light source 42 is shown to be located at the left side of the pattern record unit 91, in practice the light source 42 is positioned to face either the pattern record unit 91 or the collimator lens array 92. Namely, the light source 42 is moved to the right and left, along an arrow A, between the pattern record unit 91 and the collimator lens array 92. The light source 42 has a support frame 42a, which supports a plurality of light emitting diodes (LED) 42b. A lower end of the support frame 42a is slidably supported by a guide rail 93, and an upper end of the support frame 42a has holes through which guide shafts 96 extending in parallel to the guide rail 93 are inserted. One surface of the lower end of the support frame 42a is connected to an end of a wire 94a, the other end of which is connected to an output shaft of the light source drive motor 94. The other surface of the lower end of the support frame 42a is connected to a return spring 95.

Accordingly, when the output shaft of the light source drive motor 94 is rotated in a forward direction, the light source 42 is moved to the right in FIG. 5 against the spring force of the return spring 95, so that the light source 42 faces the collimator lens array 92. When the output shaft of the drive motor 94 is rotated in a reverse direction, the light source 42 is moved to the left in FIG. 5, due to the spring force of the return spring 95, so that the light source 42 faces the pattern record unit 91. Note that the position of the light source 42 is sensed by a photo-interrupter (not shown), and thus the light source 42 is fixed at one of the above two positions.

The LEDs 42b are arranged in the longitudinal direction of the support frame 42a, i.e., in parallel to the pattern record unit 91 and the collimator lens array 92. The pattern record unit 91 has eight holes 91a, and each of the LEDs 42b corresponds to each of the holes 91a.

Figure 6:
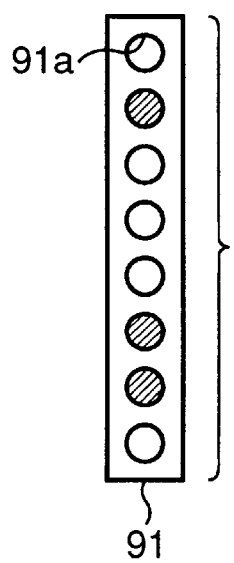
FIG. 6 is a view showing the pattern record unit.

Therefore, when the light source 42 faces the pattern record unit 91, a luminous flux outputted from each of the LEDs 42b is radiated onto the electro-developing medium 30, so that 8 bit data (or an 8 bit pattern) can be recorded therein through the holes 91a of the pattern record unit 91. The 8 bit pattern indicates a photographing condition such as color temperature information, and is recorded in the second recording area 30b. In FIG. 6, the holes 91a which are not hatched mean that the LEDs 42b corresponding to the holes 91a are lit, and the holes 91a which are hatched mean that the LEDs 42b corresponding to the holes 91a are turned OFF.

Conversely, when the light source 42 faces the collimator array 92, the luminous flux emitted from each of the LEDs 42b is converted into a parallel beam by the collimator lens array 92, so that a light beam, which is linear and extends along the collimator lens array 92, is radiated onto the electro-developing recording medium 30. The light beam passing through the electro-developing recording medium 30 is converged by the scanner optical system 43, so that an object image or an 8 bit pattern image recorded in the recording medium 30 is sensed or read by the line sensor 44.

Namely, the light source 42 is used for recording information regarding the photographing condition in the second recording area 30b, and is used for reading such information from the second recording area 30b and the object image from the first recording areas 30a.

Preferably, the light source 42 emits a blue light beam having a wavelength of approximately 450 nm, as this shows superior scattering characteristics in the electro-developed recording medium 30.

In this embodiment, the information recorded in the second recording area 30b is a color temperature of the object photographed by the still video camera. The color temperature is sensed by the colorimetry sensor 18 provided with a plurality of photoelectric conversion elements. Each of the photoelectric conversion elements has red, green and blue filter elements, respectively, each of which passes a light having a different spectral distribution from the other.

The colorimetry sensor 18 outputs signals indicating a ratio of red(R), green(G) and blue(B) signals obtained by the photoelectric conversion elements, i.e., ratios R/G and B/G. The system control circuit 20 is provided with a color temperature signalizing (C/S) table T (see FIG. 2) showing the relationships between the color temperature and the ratios R/G and B/G inputted from the colorimetry sensor 18. Namely, the color temperature of the ambient light around the object to be photographed is obtained by using the table T, and is used for control of a white balance adjustment when photographing the object.

The white balance adjustment is performed in such a manner that, when reading out each color component of an object image recorded in the electro-developing recording medium 30, an exposure period (an electric charge accumulation period) of the line sensor 44 is changed in accordance with the color temperature of the ambient light. For example, when the color temperature is relatively low, the exposure period of the line sensor 44, by which the R component image is read out, is shortened in comparison with a standard period, to prevent the object image reproduced by a display device, for example, from becoming reddish. Note that the white balance adjustment can be performed by changing a degree of amplitude of each of the color components in the amplifier 61.

The color temperature information is recorded in the second recording area 30b as a pattern image, through the light source 42 and the pattern record unit 91. The recorded color temperature information is read out from the second recording area 30b, through the light source 42, the collimator lens array 92, the scanner optical system 43 and the line sensor 44. The color temperature information read from the second recording area 30b is used to control the exposure period of the line sensor 44, when reading the object image recorded in the first recording area 30a.

The number of the LEDs 42b is eight. Four of the LEDs 42b are used for recording R/G information, and the other four of the LEDs 42b are used for recording B/G information. Namely, R/G information and B/G information are both recorded as 4 bit data.

Figure 7:
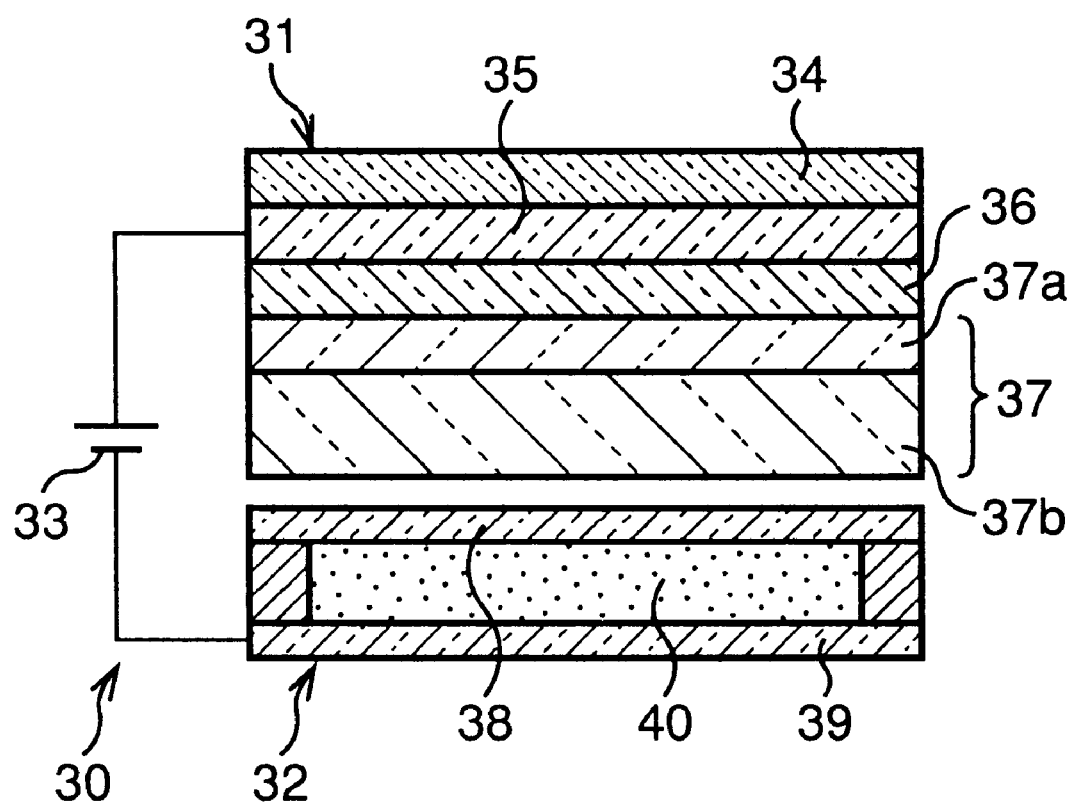
FIG. 7 is a sectional view showing a structure of an electro-developing recording medium.

FIG. 7 shows a structure of the electro-developing recording medium 30, and is the same as that shown in Japanese Unexamined Patent Publication No. 5-2280.

The electro-developing recording medium 30 comprises an electrostatic information recording medium 31 and an electric charge keeping medium 32. An electric voltage is applied to the electro-developing recording medium 30 thereto by an electric power source 33. The electrostatic information recording medium 31 is formed by laminating a glass base plate 34, an electrode layer 35, an inorganic oxide material layer 36 and a photoconducting layer 37. The photoconducting layer 37 is formed by laminating an electric charge generating layer 37a and an electric charge transferring layer 37b. The electric charge keeping medium 32 is formed by confining liquid crystal 40, which is a smectic liquid crystal, between a liquid crystal supporting plate 38 and a liquid crystal electrode layer 39. The electric charge transferring layer 37b of the photoconducting layer 37 and the liquid crystal supporting plate 38 of the electric charge keeping medium 32 face each other with a small gap therebetween.

An ON-OFF condition of the electric power source 33 is controlled by the recording medium drive circuit 41 (see FIG. 2). When the electric power source 33 is turned ON, an electric voltage is applied between the electrode layer 35 and the liquid crystal electrode layer 39, i.e., between the electrostatic information recording medium 31 and the electric charge keeping medium 32. When the electrostatic information recording medium 31 is exposed while the electric voltage is applied, an electric charge is generated in the electrostatic information recording medium 31 in accordance with an image formed thereon. Since the intensity of the electric field applied to the liquid crystal 40 is changed in accordance with the electric charge, the image is indicated on the liquid crystal 40 as a visible image, and thus, an image of an object is developed. Namely, the visible image is generated in accordance with the electric charge.

The electric charge keeping medium 32 is a liquid crystal display having a memory-type liquid crystal such as a smectic liquid crystal, and thus, the developed visible image is kept therein even if the electric field is removed. In the liquid crystal, the developed visible image can be deleted by heating the liquid crystal, using a heating device (not shown) at a predetermined temperature. In such a case, the same electric charge keeping medium 32 can be used repeatedly.

Figure 9A:
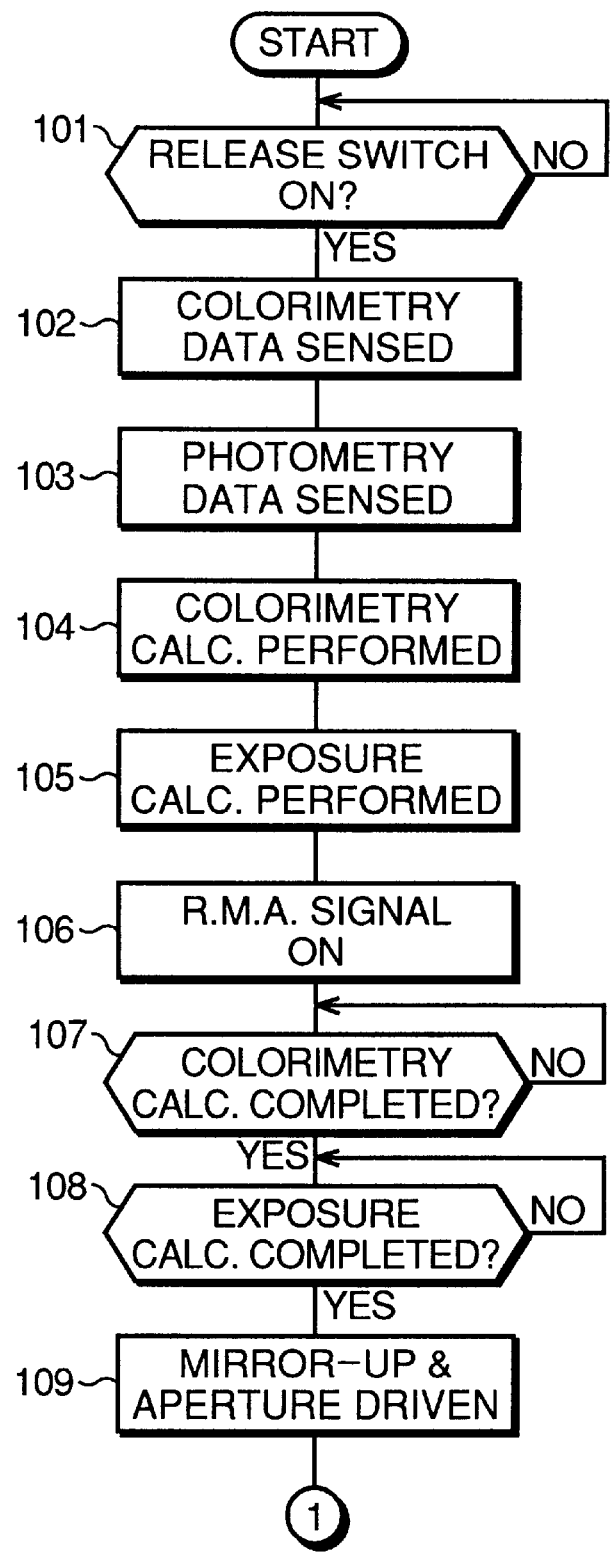
FIGS. 9A, 9B and 9C comprise a flowchart of the photographing operation, respectively.
Figure 9B:
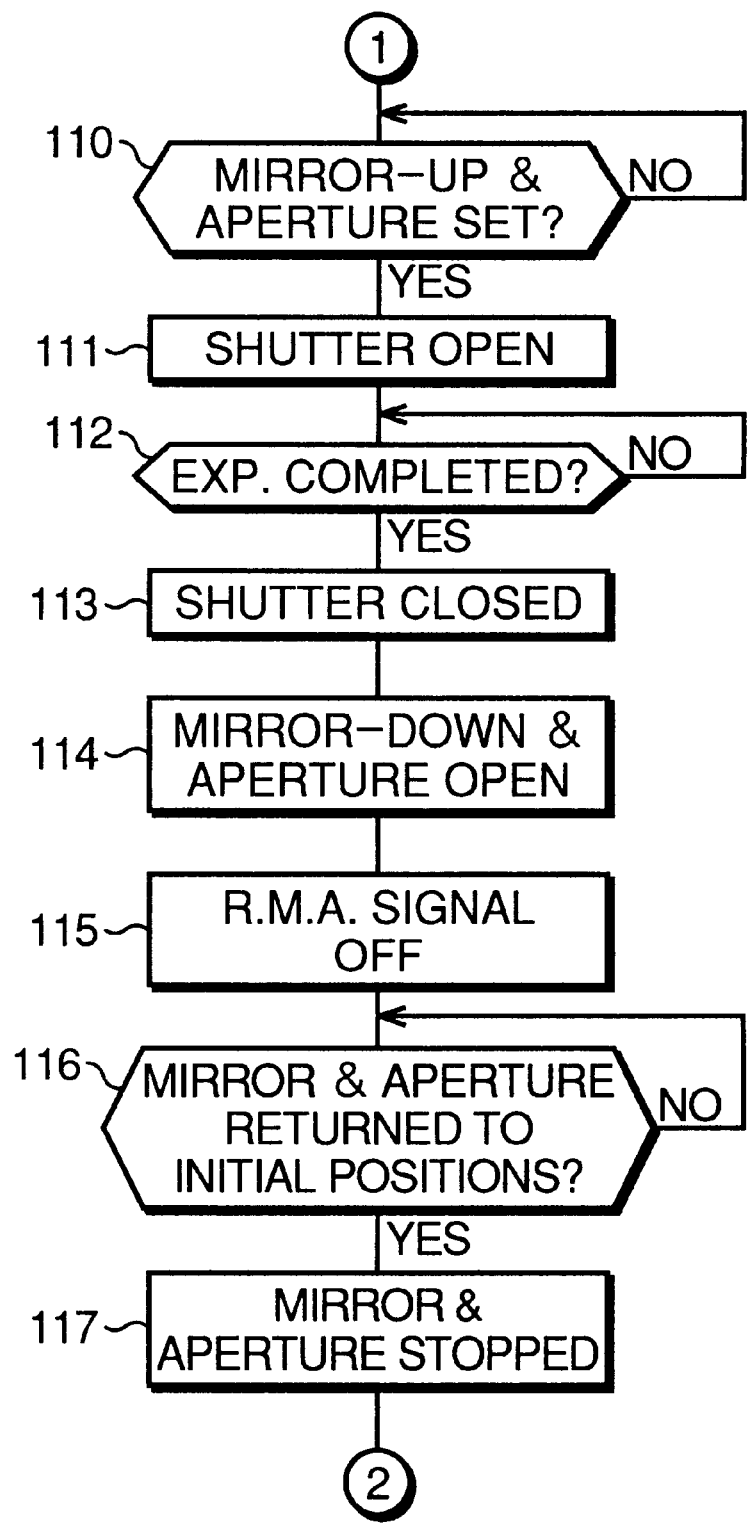
Figure 9C:
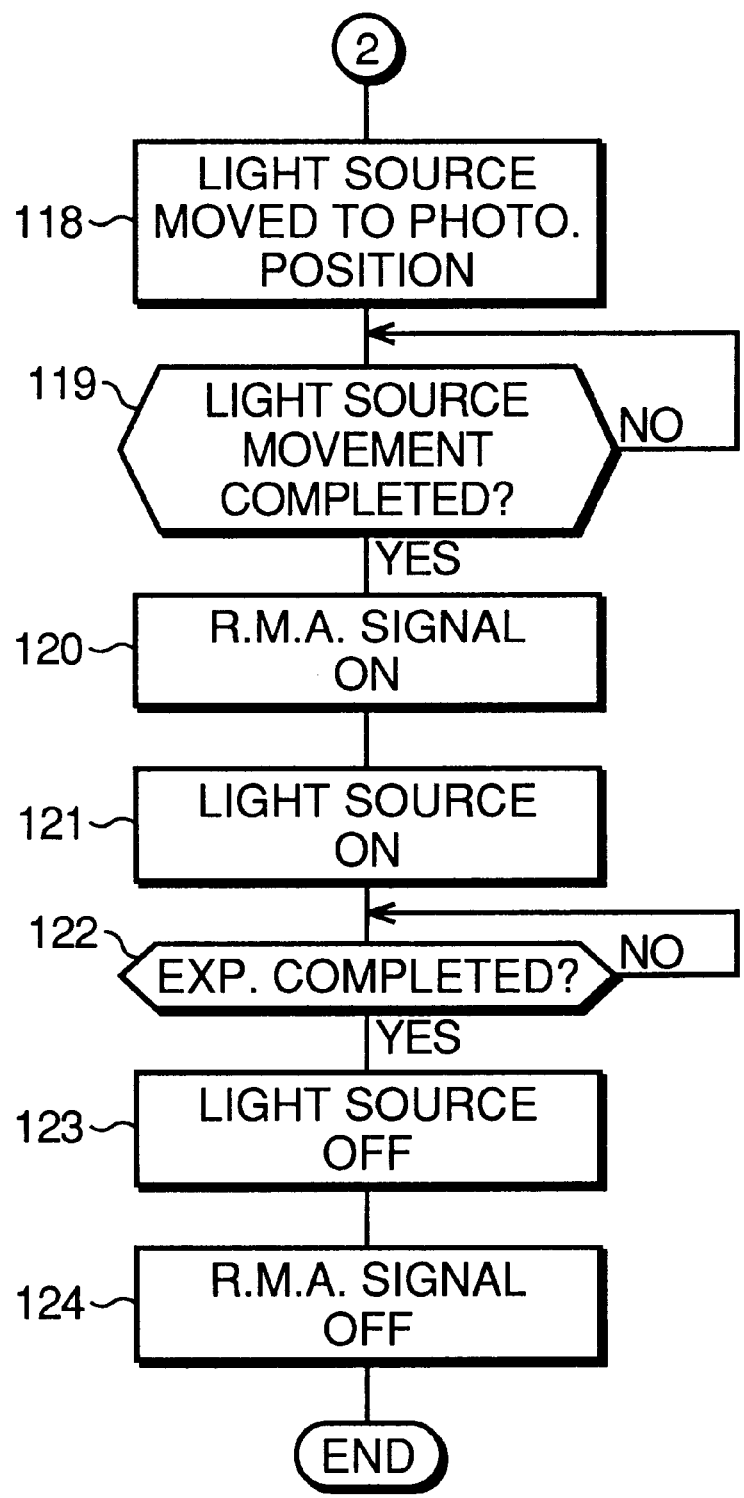
Figure 11A:
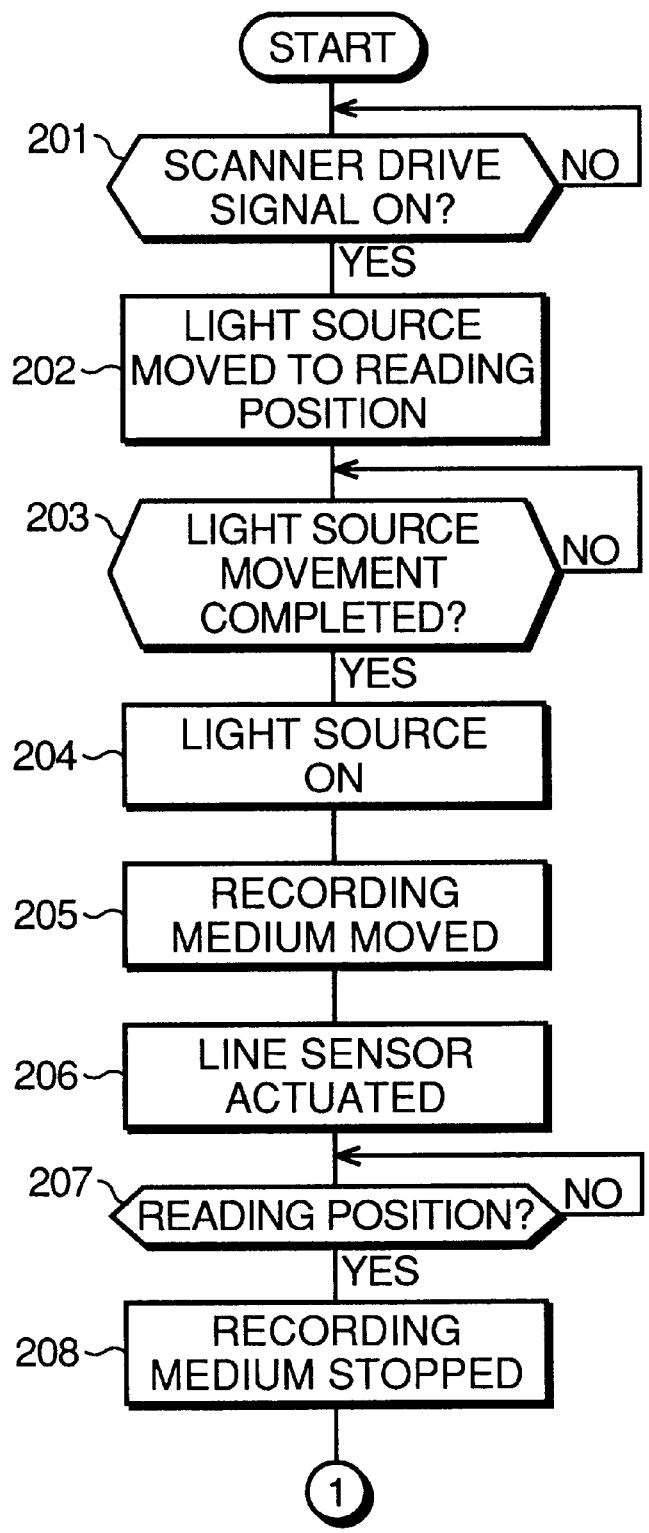
FIGS. 11A, 11B, 11C 11D and 11E comprise a flowchart of the reading operation, respectively.
Figure 11B:
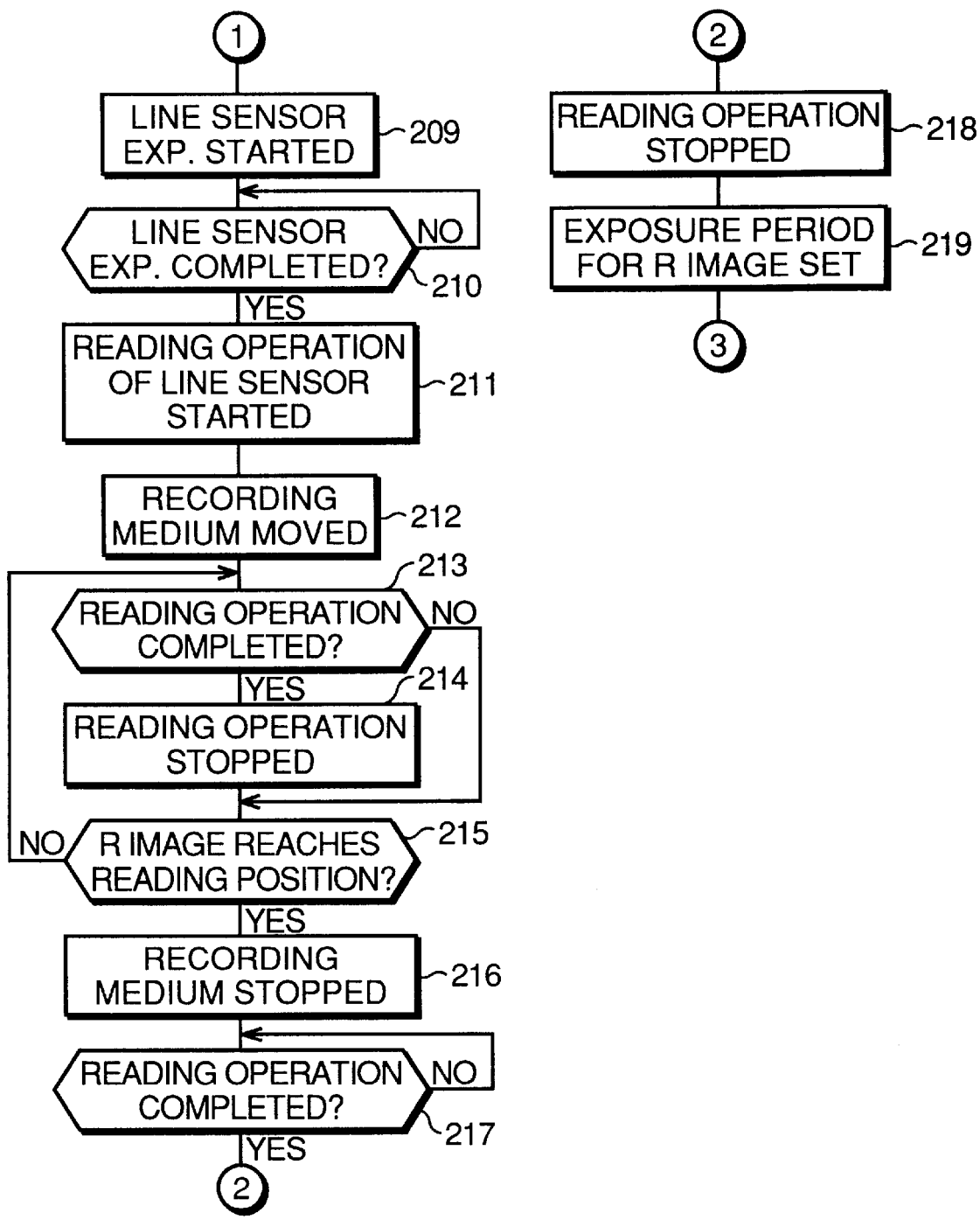
Figure 11C:
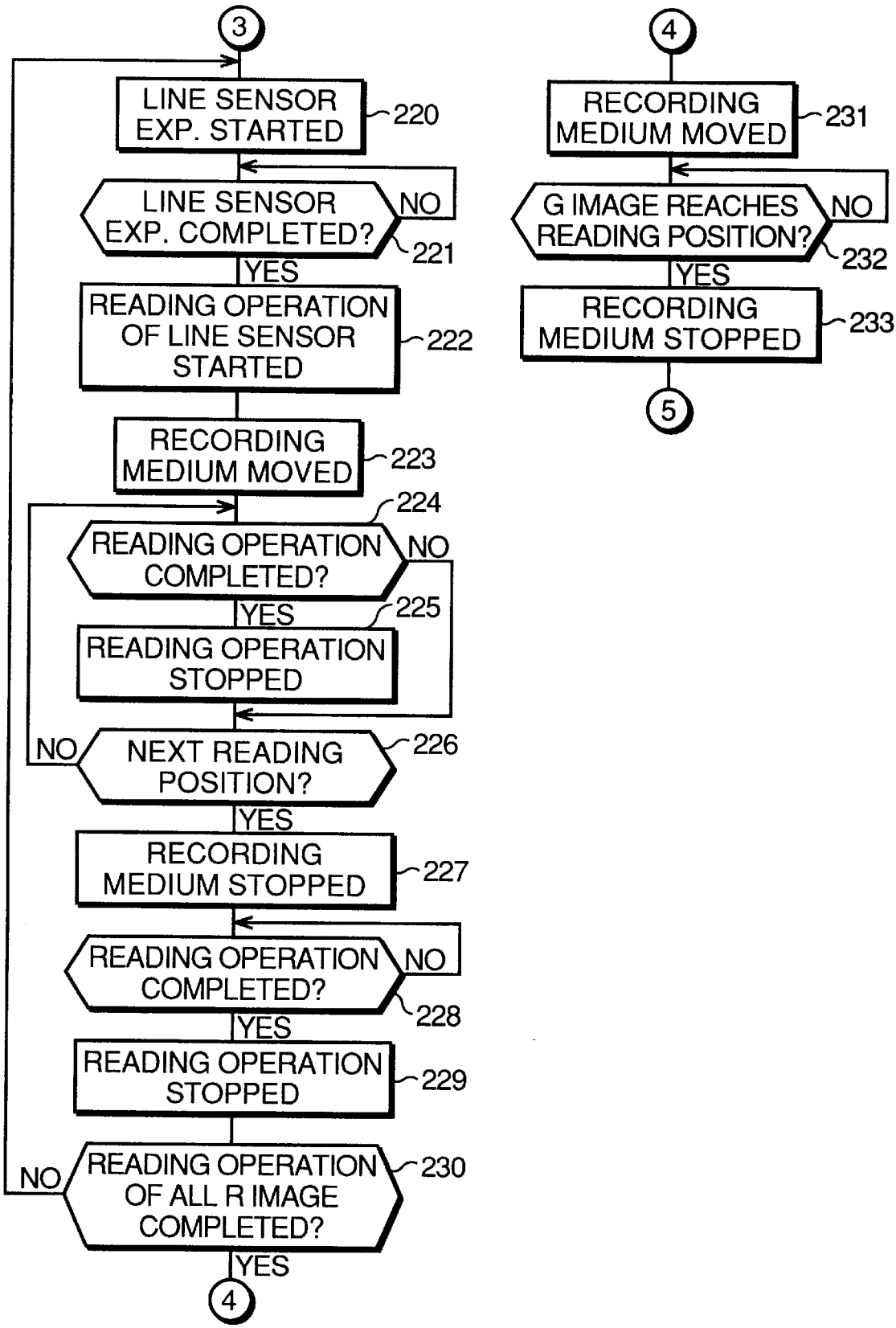
Figure 11D:
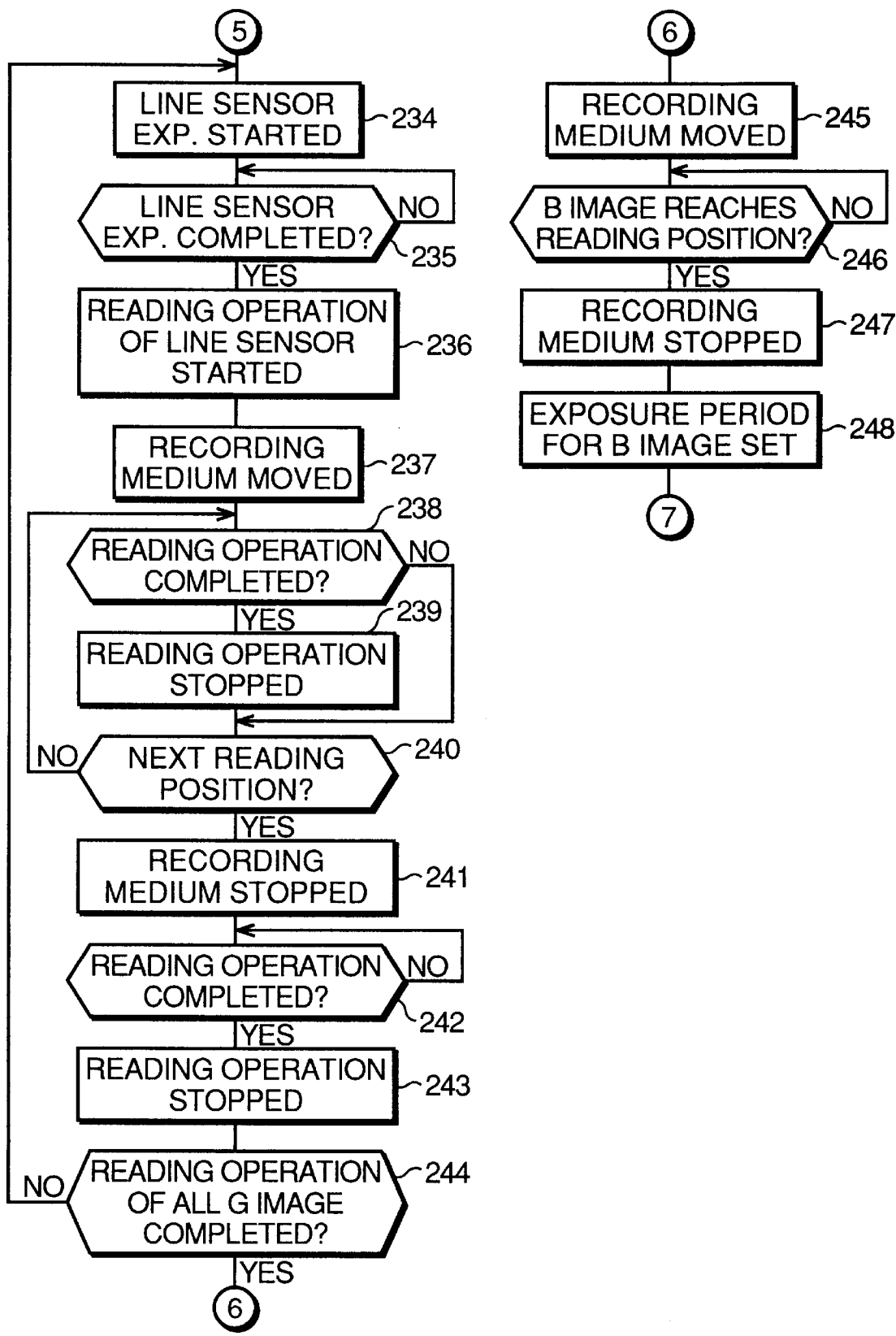
Figure 11E:
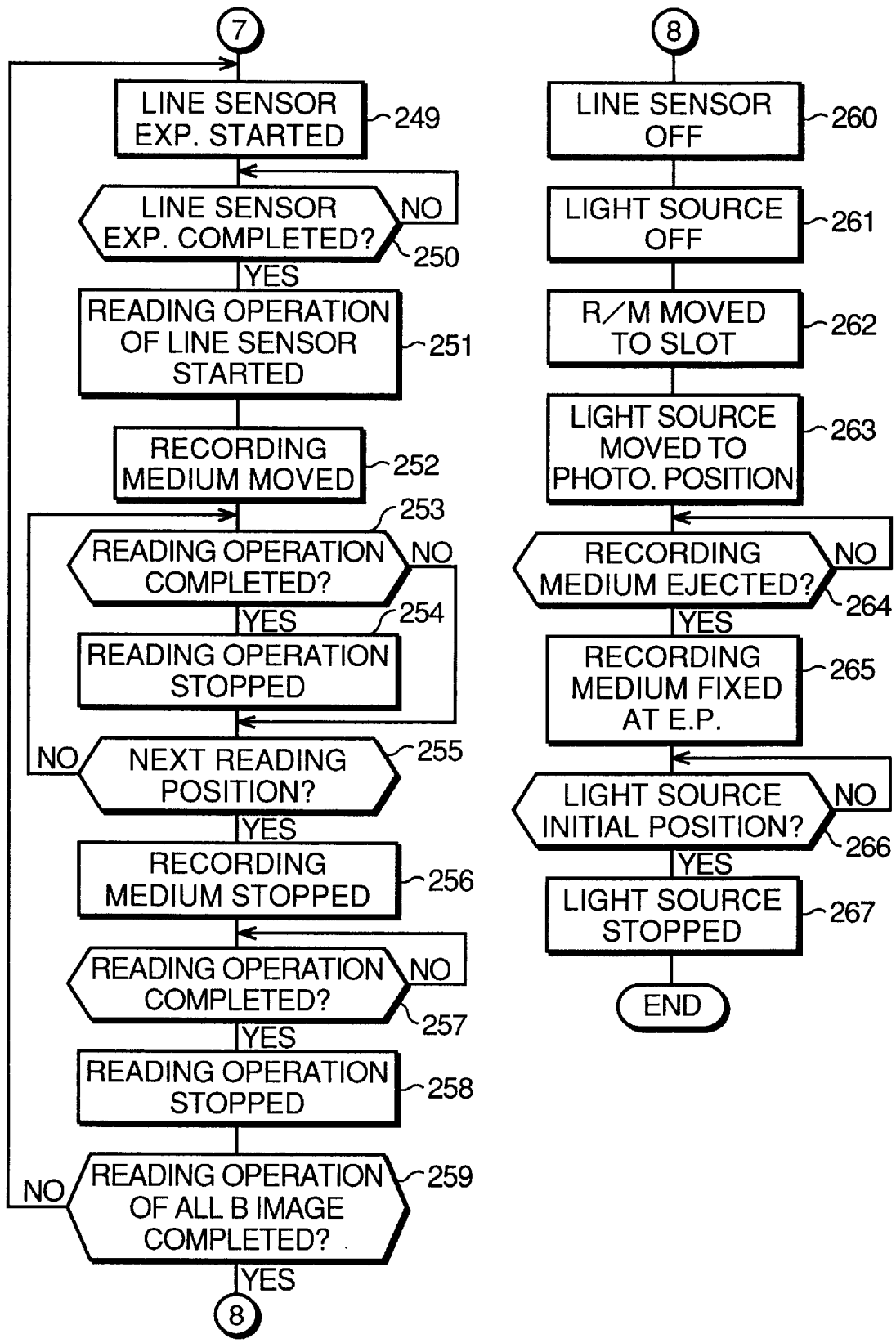

FIG. 8 shows a timing chart of a photographing operation of an image signal onto the electro-developing recording medium 30. FIGS. 9A, 9B and 9C show a flowchart of the photographing operation.

When it is sensed in Step 101 that the release switch 14 has been turned ON (reference S11), Step 102 is executed in which colorimetry data (R/G data and B/G data) outputted from the colorimetry sensor 18 are sensed. Then Step 103 is executed in which photometry data outputted from the photometry sensor 28 is sensed. In Step 104, a colorimetry calculation is performed based on the colorimetry data (reference S12), and in Step 105 an exposure calculation is carried out based on the photometry data (reference S13). After a predetermined time has passed since the release switch 14 was pressed, a recording medium activating signal is outputted in Step 106 (reference S14), whereby the electric power source 33 is turned ON to apply an electric voltage to the electrostatic information recording medium 31 and the electric charge keeping medium 32.

When it is confirmed in Step 107 that the colorimetry calculation has been completed (reference S15), and then it is confirmed in Step 108 that the exposure calculation has been completed (reference S16), Step 109 and the following Steps are carried out, so that a photographing operation is performed.

In Step 109, based on the result of the exposure calculation, the opening degree of the aperture 12a is changed from the fully open state to a predetermined opening degree (reference S17), and then, the quick return mirror 21 is changed from the down condition to the up-condition (reference S18). When it is confirmed in Step 110 that the quick return mirror 21 has been changed to the up-condition and the opening degree adjustment of the aperture 12a has been completed, the shutter 22 is opened (reference S19). When it is sensed in Step 112 that the exposure period obtained by the exposure calculation has passed, the shutter 22 is closed in Step 113 (reference S20). After the shutter 22 is closed, Step 114 is executed in which the quick return mirror 21 is changed to the down-condition (reference S21), and the aperture 12a is driven to the fully open condition (reference S22). Then, in Step 115, the output of the recording medium activating signal is stopped (reference S23).

Namely, at least while the shutter 22 is opened, the recording medium activating signal is outputted so that a predetermined electric voltage is applied to the electro-developing recording medium 30. By exposing the electro-developing recording medium 30 under this condition, an object image is developed by the recording medium 30 as a visible image, which is kept in the recording medium 30 even if the output of the recording medium activating signal is stopped.

When it is confirmed in Step 116 that the mirror 21 and the aperture 12a have been returned to the initial positions thereof, respectively, the driving operations of the mirror 21 and the aperture 12a are stopped in Step 117.

In Step 118, the light source drive motor 94 is rotated in the reverse direction, so that the light source 42 is started to move (reference S24) to a photographing position at which the light source 42 faces the pattern record unit 91, due to the spring force of the return spring 95. When it is sensed in Step 119 that the light source 42 has been set to the photographing position (reference S25), based on a signal outputted from the photo-interrupter (not shown), the recording medium activating signal is again outputted in Step 120 (reference S26), so that an electric voltage is applied to the electrostatic information recording medium 31 and the electric charge keeping medium 32.

In Step 121, each of the LEDs 42b is lit or put out by the light source drive circuit 45 under control of the system control circuit 20, so that the light source 42 is lit in accordance with color temperature of the ambient light of the object to be photographed (reference S27), and thus 8 bit pattern data is recorded in the center portion (shown by a chained line PW in FIG. 4) of the second recording area 30b. When it is confirmed in Step 122 that a predetermined time has been passed since the light source 42 was lit, i.e., when it is confirmed that the exposure has been completed, the light source 42 is turned OFF in Step 123 (reference S28). Then, the output of the recording medium activating signal is stopped in Step S29 (reference 124), and thus the photographing operation is completed.

FIG. 10 shows a timing chart of a reading operation by which an object image recorded in the electro-developing recording medium 30 is read out therefrom. FIGS. 11A, 11B, 11C, 11D and 11E show a flowchart of the reading operation.

When it is sensed in Step 201 that a scanner drive signal has been outputted by operating the scan start switch 16 (reference S31), the light source drive motor 94 is driven in Step 202 and the light source 42 is started to move toward a reading position at which the light source 42 faces the collimator lens array 92 (reference S32). When it is sensed in Step 203 that the light source 42 has been set to the reading position (reference S33), based on a signal outputted from the photo-interrupter (not shown), the light source 42 is lit in Step 204 (reference S34). In Step 205, a recording medium feeding signal is outputted, and accordingly, the recording medium drive motor 47 is driven so that the electro-developing recording medium 30 is started to move from the photographing position to a position at which the line sensor 44 is placed (reference S35). In Step 206, a line sensor drive signal is outputted (reference S36) so that the line sensor 44 is actuated.

When it is sensed in Step 207 that the center portion PW of the second reading area 30b has reached the reading position at which the light source 42 faces the collimator lens array 92, the output of the recording medium feeding signal is stopped in Step 208 (reference S37), and the recording medium drive motor 47 is stopped. This stopping operation is performed, for example, in accordance with pulse signals used for rotating the recording medium drive motor 47.

In Step 209, an exposure of the line sensor 44 is started (reference S38), so that an electric charge is accumulated in the line sensor 44. When it is confirmed in Step 210, by sensing, for example, that a constant time has passed, that the exposure of the line sensor 44 has been completed, in Step 211, a reading operation of the line sensor 44 is started, and accordingly, an output of an image signal of a pattern image recorded in the second recording area 30b is started (reference S39). In Step 212, the recording medium feeding signal by which the recording medium drive motor 47 is rotated in the forward direction is outputted (reference S40), so that the electro-developing recording medium 30 is moved toward the line sensor 44.

An image signal corresponding to the pattern image read out through the line sensor 44 is subjected to a predetermined process and is stored in the memory 64. This image signal is decoded and converted to R/G data and B/G data, which are used for setting exposure amounts (exposure accumulation periods) of the line sensor 44 when reading an R image and a B image, as described later.

During the movement of the electro-developing recording medium 30, when it is confirmed in Step 213 that the reading operation of the line sensor 44 has been completed, the reading operation is stopped in Step 214 (reference S41). Note that the completion of the reading operation is controlled by counting signals, for example, outputted from the line sensor drive circuit 46 to drive the line sensor 44. When the completion of the reading operation is not confirmed in Step 213, Step 214 is skipped and Step 215 is executed, so that it is determined whether or not a first scanning line PR (see FIG. 4), which is included in the R image recorded in the first recording area 30a and should be read out first, has reached the reading position P (see FIG. 2) due to the movement of the electro-developing recording medium 30. When the first scanning line PR has not reached the reading position P, Steps 213 through 215 are executed again.

When it is confirmed in Step 215 that the first scanning line PR of the R image has reached the reading position P, the output of the recording medium feeding signal is stopped in Step 216, and the recording medium drive motor 47 is stopped (reference S42). This stopping operation is controlled by counting pulse signals for operating the recording medium drive motor 47, for example. Then, in Step 217, the completion of the reading operation of the line sensor 44 is confirmed similar to Step 213, and the reading operation is stopped in Step 218. Namely, even when the loop of Steps 213 through 215 ends without executing Step 214, the reading operation of the line sensor 44 is completed in Step 218.

In Step 219, based on the R/G value of the color temperature information decoded in accordance with the pattern image recorded in the second recording area 30b in Steps 207 through 218, an exposure amount (an electric charge accumulation period) for which one scanning line of the R image is read out from the first recording area 30a by the line sensor 44 is set (reference S43).

Note that the exposure amount is set such that the exposure period becomes shorter as the color temperature of the color image has a larger value (i.e., the larger the color temperature of the color image, the shorter the exposure period), a standard value of the exposure amount being an exposure amount by which the G image is properly exposed. For example, when R/G is larger than B/G, the electric charge accumulation period of the line sensor 44, by which the R image recorded in the first recording area 30a is read, is set to be shorter than the electric charge accumulation period of the line sensor 44 by which the B image is read. Each of the color image signals, which is subjected to the white balance adjustment, is outputted through the line sensor 44.

In Step 220, an exposure of the line sensor 44 is started (reference S44), so that electric charge accumulation corresponding to one scanning line is performed. In Step 221, it is confirmed that a predetermined time corresponding to the exposure amount of the R image set in Step 219 has passed, and thus it is confirmed that the exposure has been completed (reference S45). Then, in Step 222, a reading operation of the line sensor 44 is started. Namely, an output of pixel signals of the R image is started and is stored in the memory 64 (reference S46). In Step 223, the recording medium feeding signal by which the recording medium drive motor 47 is rotated in the forward direction is outputted (reference S47), so that the electro-developing recording medium 30 is further moved.

Then, similar to Steps 213 through 218, Steps 224 through 229 are executed. Note that, in Step 226, it is determined whether or not the next scanning line of the first recording area 30a has been set at the reading position P.

In Step 230, it is determined whether or not the reading operation for all of the scanning lines of the R image has been completed, i.e., whether or not the reading operation for the first recording area 30a in which the R image is recorded has been completed. The total number of scanning lines is 2000, for example. The determination in Step 230 is made by checking a value of a counter, which is incremented by one in Step 222, for example. When the reading operation of the R image has not been completed, the process returns to Step 220, and the operations described above are again carried out.

In this embodiment, the electro-developing recording medium 30 is repeatedly moved and then stopped after a predetermined time, and the images recorded in the first and second recording areas 30a and 30b are sensed by the line sensor 44 while the recording medium 30 is stopped, so that the image signals corresponding to the images are read out through the line sensor 44.

When it is determined in Step 230 that all of the scanning lines of the R image have been read out, the process goes from Step 230 to Step 231, in which the recording medium feeding signal is outputted, and thus the recording medium drive motor 47 is rotated in the forward direction, so that the recording medium 30 is further moved. In Step 232, it is determined whether or not the first scanning line PG (see FIG. 4) of the G image has reached the reading position P due to the movement of the recording medium 30. When it is confirmed that the first scanning line PG of the G image has reached the reading position P, the output of the recording medium feeding signal is stopped in Step 233, and accordingly, the recording medium drive motor 47 is stopped (reference S50).

Note that the exposure amount of the G image has a predetermined value which is the standard value for the exposure amounts, and therefore, the G exposure amount does not need to be adjusted as in Step 219.

In Steps 234 through 247, all of the scanning lines of the G image are read out through the line sensor 44, as in Steps 220 through 233. When the reading operation for all of the scanning lines of the G image has been completed, in Step 248, based on the value of B/G of the color temperature information, an exposure amount (an electric charge accumulation period) for the B image is set (reference S51), similar to the case of the R image.

In Steps 249 through 259, all of the scanning lines of the B image are read out through the line sensor 44, as in Steps 220 through 230. When it is confirmed in Step 259 that the reading operation for all of the scanning lines of the B image has been completed, i.e., when it is confirmed that all of the image signals, including the R, G and B image signals, have been read out, the line sensor drive signal by which the line sensor 44 is actuated is changed to an OFF condition (reference S52) in Step 260, and in Step 261 the light source 42 is put out (reference S53). The shutter 22 is then closed, and in Step 262, the recording medium feeding signal is outputted so that the electro-developing recording medium 30 is started to move back to the slot 19 (reference S54). In Step 263, the light source 42 is started to move to the initial position, i.e., the photographing position (reference S55).

When it is confirmed in Step 264 that the electro-developing recording medium 30 has been returned to an ejected position at which a part of the recording medium 30 is projected from the slot 19, the output of the recording medium feeding signal is stopped in Step 265 (reference S56), so that the recording medium 30 is fixed at the eject position. When it is confirmed in Step 266 that the light source 42 has been returned to the initial position, the light source drive motor 94 is stopped so that the movement of the light source 42 is stopped (reference S57).

The sensing operation in which the light source 42 has been returned to the initial position is performed based on a signal which is outputted by a part of the light source 42 traversing a photo-interrupter (not shown).

As described above, the simple construction of the embodiment enables an object image to be recorded in the first recording area 30a, and a pattern image corresponding to information of the photographing condition, i.e., color temperature information of the object image to be recorded in the second recording area 30b provided in a portion different from that of the first recording area 30a. The object image recorded in the first recording area 30a is read out therefrom based on the color temperature information recorded in the second recording area 30b, and thus an image, which has been subjected to a white balance adjustment to thereby have a natural color, can be obtained.

Since information relating to the photographing condition is recorded in the second recording area 30b, this information can be read out from the second recording area 30b in the same way as an operation in which an object image is read out from the first recording area 30a, and therefore, the structure of the still video camera is simplified.

Note that the photographing condition recorded in the recording medium 30 is not restricted to the color temperature information, but may be information such as a photographing date.

Further, note that the electro-developing recording medium 30 is not restricted to the structure described above, and may be any other structure by which an image is electronically developed.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 7-197028 (filed on Jul. 10, 1995) which is expressly incorporated herein, by reference, in its entirety.

I claim:

1. An image recording device comprising:
   a recording medium having a first recording area in which an object image is recorded, and a second recording area in which information other than said object image is recorded;

a light source having a plurality of light source elements, said light source emitting a light beam to illuminate said first recording area and said second recording area, wherein said light source is controlled in accordance with a first mode when said light beam is illuminating said first recording area to read the object image and is controlled in accordance with a second mode when said light beam is illuminating said second recording area to record the information, each of said plurality of light source elements being selectively actuatable to record the information in the second recording area when said light source is controlled in accordance with said second mode; and a moving mechanism that moves the recording medium and the light source relative to each other.

2. A device according to claim 1, wherein said recording medium is an electro-developing recording medium by which an image formed thereon is electronically developed.

3. A device according to claim 1, wherein said electro-developing recording medium comprises an electrostatic information recording medium generating an electric charge in accordance with an image formed thereon, and an electric charge keeping medium which generates a visible image in accordance with said electric charge and which can keep said visible image.

4. A device according to claim 3, wherein said electric charge keeping medium is a liquid crystal display having a memory-type liquid crystal.

5. The image recording device according to claim 1, said plurality of light source elements being activatable together to illuminate the recording medium in said first mode.

6. An image recording device comprising:

a recording medium having a first recording area in which an object image is recorded, and a second recording area in which information other than said object image is recorded, said information being obtained before said object image is recorded, said information being recorded in said second recording area, after said object image is recorded;

a first reading system that reads the object image;

a second reading system that reads said information;

a light source that emits a light beam to illuminate the recording medium; and a control system that controls said light source so that said first recording area and said second recording area are uniformly illuminated when said first reading system reads said object image and said second reading system reads said information, said first reading system reading said object image subsequent to said second reading system reading said information.

7. A device according to claim 6, wherein said information recorded in said second recording area is color temperature information when said object image is photographed.

8. A device according to claim 6, wherein said first recording area has a plurality of recording portions, wherein an image is recorded in each of said plurality of recording portions, and wherein each said image is different in color from all of the other of said images.

9. A device according to claim 8, further comprising a system that reads out said object image recorded in said first recording area based on said information recorded in said second recording area.

10. A device according to claim 9, wherein said reading system has a line sensor disposed to face said light source, and a system that moves at least one of said recording medium, said light source and said line sensor so that said object image can be sensed by said line sensor.

11. A device according to claim 6, wherein said light source has a plurality of light emitting diodes, and said control system controls said plurality of light emitting diodes based on said information.

12. A device according to claim 6, wherein said recording medium is an electro-developing recording medium by which an image formed thereon is electronically developed.

13. A device according to claim 12, wherein said electro-developing recording medium comprises an electrostatic information recording medium generating an electric charge in accordance with an image formed thereon, and an electric charge keeping medium which generates a visible image in accordance with said electric charge and which can keep said visible image.

14. A device according to claim 13, wherein said electric charge keeping medium is a liquid crystal display having a memory-type liquid crystal.

15. A device according to claim 12, wherein said light source emits an illumination light beam by which said electro-developing recording medium is illuminated.

16. A device according to claim 15, wherein said second recording area is illuminated by said illumination light beam so that an information image corresponding to said information is developed by said second recording area.

17. A device according to claim 15, wherein said plurality of light source elements comprises a plurality of light emitting diodes, a pattern image corresponding to said information is formed on said second recording area when selective ones of said plurality of light emitting diodes are turned ON.

18. A device according to claim 17, further comprising a system that controls turning ON and OFF of said light emitting diodes.

19. A device according to claim 6, wherein said reading system comprises a line sensor sensing said light beam emitted by said light source and passing through said first recording area, and a moving system that moves at least one of said recording medium, said light source and said light sensor in a direction perpendicular to said light beam so that said object image can be sensed by said light sensor.

20. A device according to claim 6, wherein said reading system reads out said object image in accordance with said information.

21. The image recording device according to claim 7, said light source comprising a plurality of light source elements;

said light source control system independently activating each of said plurality of light source elements in accordance with said color temperature information when an optical recording operation is being performed, said light source control system controlling said light source so as to uniformly illuminate the recording medium when an object image reading operation is being performed.

22. The image recording device according to claim 21, further comprising a collimator lens; and said light source control system moving at least one of said light source and said collimator lens when an object image reading operation is being performed so that a light beam output from said light source passes through said collimator lens, becomes a parallel light beam and is incident upon the recording medium.

23. The image recording device according to claim 8, said information comprising color temperature information, said second reading system comprising a charge coupled device, said reading system reading the color temperature information recorded in said recording medium and then controlling a photographing period of said charge coupled device for each color component of said recorded image to adjust a color balance of the recorded image.

24. The image recording device according to claim 6, said first reading system and said second reading system utilizing a common sensor.

25. An image recording device comprising:

a recording medium having a first recording area in which an object image is recorded, and a second recording area provided in a portion of said recording medium different from said first recording area;

a light source, said light source comprising a plurality of light source elements;

an image recording system that records an object image in said first recording area;

an information recording system that records color temperature information of said object image in said second recording area when said image recording system records said object image, said information recording system independently actuating each of said plurality of light source elements in accordance with the color temperature information;

an image reading system that reads said object image recorded in said first recording area; and an information reading system that reads said information recorded in said second recording area when said image reading system reads said object image, said image reading system and said information reading system utilizing a light beam output from said light source as an illumination light beam for uniformly illuminating the recording medium.

26. A device according to claim 25, wherein said information reading system has a line sensor, said image reading system controlling an electric charge accumulating period when electric charges are accumulated in said line sensor, based on said information.

* * * * *